United States Patent [19]

Robinson et al.

[11] Patent Number: 4,598,557
[45] Date of Patent: Jul. 8, 1986

[54] INTEGRATED HEAT PUMP WATER HEATER

[75] Inventors: Glen P. Robinson, Atlanta; Andrew L. Blackshaw, Dunwoody, both of Ga.

[73] Assignee: Southern Company Services, Inc., Atlanta, Ga.

[21] Appl. No.: 781,093

[22] Filed: Sep. 27, 1985

[51] Int. Cl.[4] .................................... F25B 27/00
[52] U.S. Cl. ..................... 62/238.6; 62/238.7
[58] Field of Search .................. 62/238.6, 238.7; 237/2 B

[56] References Cited

U.S. PATENT DOCUMENTS

| | | | |
|---|---|---|---|
| 4,249,390 | 2/1981 | Jones | 62/238.7 |
| 4,299,098 | 11/1981 | Derosier | 62/238.6 |
| 4,399,664 | 8/1983 | Derosier | 62/238.7 |
| 4,409,796 | 10/1983 | Fisher | 62/238.7 X |
| 4,448,037 | 5/1984 | Hama et al. | 62/238.7 X |
| 4,492,092 | 1/1985 | Smorol et al. | 62/238.6 X |
| 4,493,193 | 1/1985 | Fisher | 62/238.7 X |
| 4,507,938 | 4/1985 | Hama et al. | 62/238.6 X |
| 4,514,990 | 5/1985 | Sulkowski | 62/238.7 |
| 4,528,822 | 7/1985 | Glamm | 62/238.6 X |
| 4,553,401 | 11/1985 | Fisher | 62/238.7 X |

Primary Examiner—Lloyd L. King
Attorney, Agent, or Firm—Sumner C. Rosenberg; William H. Needle

[57] ABSTRACT

An economical full capacity integrated heat pump water system which utilizes the basic components of conventional heat pump systems and a hot water heat exchanger incorporated in the system. The invention may be operated in three refrigerant flow configurations, with five associated operational modes. In one configuration, the refrigerant flow is from the compressor, through the hot water heat exchanger, through the outdoor heat exchanger, through an expansion device, through the indoor heat exchanger and back to the compressor. In a second configuration, the refrigerant flow is from the compressor, through the hot water heat exchanger, through the indoor heat exchanger, through an expansion device, through the outdoor heat exchanger, and back to the compressor. In a third configuration, for the water heating only mode, the refrigerant flow is from the compressor, through the hot water heat exchanger, through an expansion device designed specifically for the range of refrigerant temperatures for hot water heating, through the outdoor heat exchanger, and back to the compressor.

14 Claims, 4 Drawing Figures

INTEGRATED HEAT PUMP WATER HEATER

BACKGROUND OF THE INVENTION

This invention pertains to combining space heating and cooling systems with water heating systems. More particularly, the present invention utilizes a heat pump to variously provide space heating or cooling, either alone or in conjunction with water heating, or water heating alone.

The use of heat pumps to provide heat or cool air to an interior space dependent on the refrigerant flow path is well known. The basic elements of such systems include a compressor, an indoor heat exchanger, an outdoor heat exchanger and refrigerant expansion devices. Such a heat pump system is used to heat an interior space by directing refrigerant from the compressor or to be condensed in the indoor heat exchanger, then through an expansion device to the outdoor heat exchanger, where the refrigerant is evaporated and directed to the compressor. The system may be used to cool the indoor space by redirecting the flow of refrigerant in the cycle such that the indoor heat exchanger is the evaporator and the outdoor heat exchanger is the condensor.

Furthermore, it is known that heat pumps may be used to heat water for hot water storage systems.

In order to provide a more economical system, as well as to conserve energy usage, a number of combined systems have been proposed whereby water heating is incorporated in an interior air heat pump space conditioner. Such systems economize on construction by allowing some common elements, such as the compressor and the outdoor heat exchanger, to serve both water heating and space conditioning functions. Such systems economize on energy usage, for example, by utilizing heat removed from the interior space during cooling to heat hot water, rather than discharging all of such heat as waste heat.

U.S. Pat. No. 4,249,390 to Jones disclosed a heat pump waste heating system which utilizes an additional water-refrigerant heat exchanger. This system does not disclose a separate water heating cycle and does not provide for a dedicated refrigerant path to bypass the indoor air heat exchanger.

U.S. Pat. No. 4,311,498 to Miller discloses a desuperheater control system which utilizes superheat to heat water in a refrigeration apparatus. This patent does not provide for heating of air.

U.S. Pat. No. 4,399,664 to Derosier discloses a heat pump water heating system which utilizes two in-line heat exchangers which may be optionally utilized to control the amount of heat recovered by heating water.

U.S. Pat. No. 4,448,037 to Hama et al. discloses a combined cooling, heating and hot water service system. In this patent the heating of hot water is constrained to occur during times of the day when heating and cooling is not required.

U.S. Pat. No. 4,492,092 to Sinoral et al. discloses a combined cooling, heating and hot water system wherein the water heating portion of the system has controls to maintain safe hot water temperatures for domestic use.

U.S. Pat. No. 4,507,938 to Hama et al. discloses a combined heating, cooling and hot water heating system with dual refrigeration devices.

U.S. Pat. No. 4,514,990 to Sulkowski discloses a combined heating, cooling and hot water heating system which requires an extra condensor to remove excess heat from the refrigerant when the system is in the water heating only mode.

A need still exists in the field of combined heat pump-hot water service systems for an economical and practical system. The prior art either requires additional major components, restricts the use of water heating, or does not provide a dedicated path to allow for water heating without operation of the space conditioning. Furthermore, conventional heating and air conditioning expansion valves are not appropriate for use under conditions of water heating alone, and will result in unstable or limited operation.

SUMMARY OF THE INVENTION

The present invention provides an economical full capability integrated heat pump water heater system which utilizes the basic components of conventional heat pump systems; that is, a compressor, an indoor heat exchanger unit, an outdoor heat exchanger unit, necessary expansion devices for each direction of refrigerant flow, and the necessary piping, valves and controls. In addition, a hot water heat exchanger is incorporated in the system. Beyond these essential parts, this invention requires only the additional valves, controls and expansion device to provide a dedicated expansion path for the refrigerant in the water heating only mode of operation, and a controllable restriction on the flow of water to the heat exchanger during the heating or cooling modes. In addition, the fan for moving air through the outdoor heat exchanger may have adjustable speeds to prevent overloading of the compressor from excessive evaporator pressure during the water heating only mode when the outside air temperature is high.

The invention may be operated in three refrigerant flow configurations, with five associated operational modes. In one configuration, the refrigerant flow is from the compressor, through the hot water heat exchanger, through the outdoor heat exchanger, through an expansion device, through the indoor heat exchanger, and back to the compressor. Two operational modes can occur in this configuration: cooling the interior air alone or in conjunction with heating water.

In a second configuration, the refrigerant flow is from the compressor, through the hot water heat exchanger, through the indoor heat exchanger, through an expansion device, through the outdoor heat exchanger, and back to the compressor. Two additional operational modes can occur in this configuration: heating the interior air alone or in conjunction with water heating.

The third configuration, for the water heating only mode, comprises a refrigerant flow from the compressor, through the hot water heat exchanger, through an expansion device designed specifically for the range of refrigerant temperatures for hot water heating, through the outdoor heat exchanger, back to the compressor. The expansion valve may be of the capillary tube type.

In the various heating and cooling modes, the flow of the hot water through the hot water heat exchanger is restricted so that superheat is removed from the refrigerant, but so that is is not fully condensed. Unrestricted flow during the water-heating only mode can allow full condensing of the refrigerant in the hot water heat exchanger, depending on water temperature.

Therefore, it is an object of the present invention to provide a heat pump system which provides space heating or space cooling alone or with water heating, and water heating alone.

It is a further object of this invention to provide such an integrated heat pump water heating system which is economical in construction.

It is yet a further object to provide such an integrated heat pump water heating system which conserves energy by beneficially utilizing waste heat to heat water.

These and other objects and advantages will appear from the following description with reference to the drawings.

DESCRIPTION OF THE PREFERRED EMBODIMENT

The preferred embodiment is now described with reference to the drawings, in which like numbers indicate like parts throughout the views.

Figure 1:
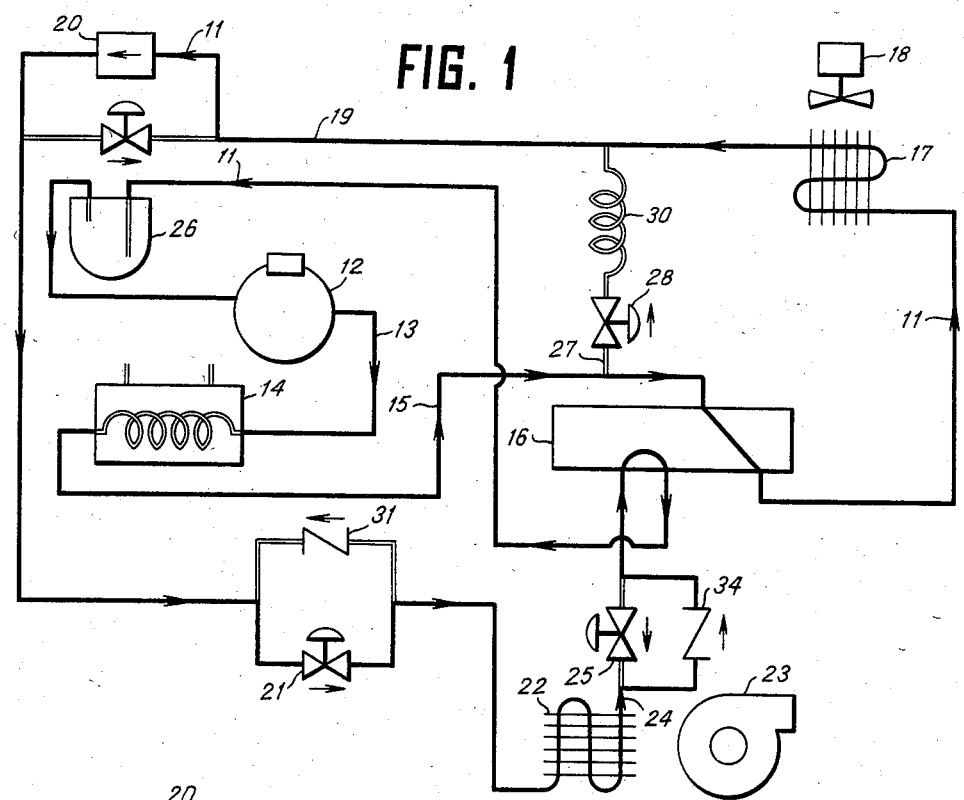
FIG. 1 is a schematic diagram of the refrigerant flow portion of an integrated heat pump water heater system, showing a first refrigerant flow configuration.

FIG. 1 is a schematic diagram of the refrigerant flow portion of the heat pump water heater system, showing the path and direction of flow, by means of arrows 11, when the system is configured to provide cooling to the interior space. The compressor 12 supplies hot, superheated refrigerant under high pressure through refrigerant line 13 to a refrigerant-to-water heat exchanger 14. The hot gas is transported through refrigerant line 15 to the reversing valve 16. This valve directs the hot gas to the outdoor coil 17 and fan unit 18 where refrigerant heat is removed to the outdoor ambient air and the refrigerant is condensed to a high pressure liquid. The high pressure liquid is transported through refrigerant line 19 and a check valve 20 to the expansion device 21 located at the indoor coil 22 and blower unit 23. The expansion device reduces the pressure on the refrigerant thereby throttling the refrigerant from a high pressure, high temperature liquid to a low pressure, low temperature refrigerant. This refrigerant is then evaporated by the indoor refrigerant to air coil 22 by removing heat from the indoor air as the indoor blower 23 circulates air over the coil. The low pressure gas is transported through refrigerant line 24 and then through check valve 34 to reversing valve 16. the reversing valve 16 then directs the refrigerant to the suction accumulator 26, which is then returned to compressor 12 where the low pressure gas is compressed to a high pressure, high temperature gas for the next cycle. It is important to note the refrigerant circuit including refrigerant line 27, solenoid valve 28, and fixed restriction expansion device 30 is made inactive in this mode by solenoid valve 28 being closed.

Water may be substituted for air as the heat exchange medium in the outdoor heat exchanger, in which case the outdoor coil and fan unit will be replaed by a heat exchanger. The water may be supplied by a closed loop system where the water is heated or cooled by the ground after circulating through the heat exchanger. The water may also be supplied by an external source of water, such as a lake or pond.

The configuration in FIG. 1 can be utilized to provide space cooling, with or without the water heating function. When no water is circulated through the water side of the refrigerant-to-water heat exchanger 14, no water is heated and the system acts simply as a space cooler. By circulating water through heat exchanger 14, the water is heated by removing some or all of the superheat from the refrigerant. The outdoor coil 17 and fan unit 18 operates to complete condensation of the refrigerant.

Figure 2:
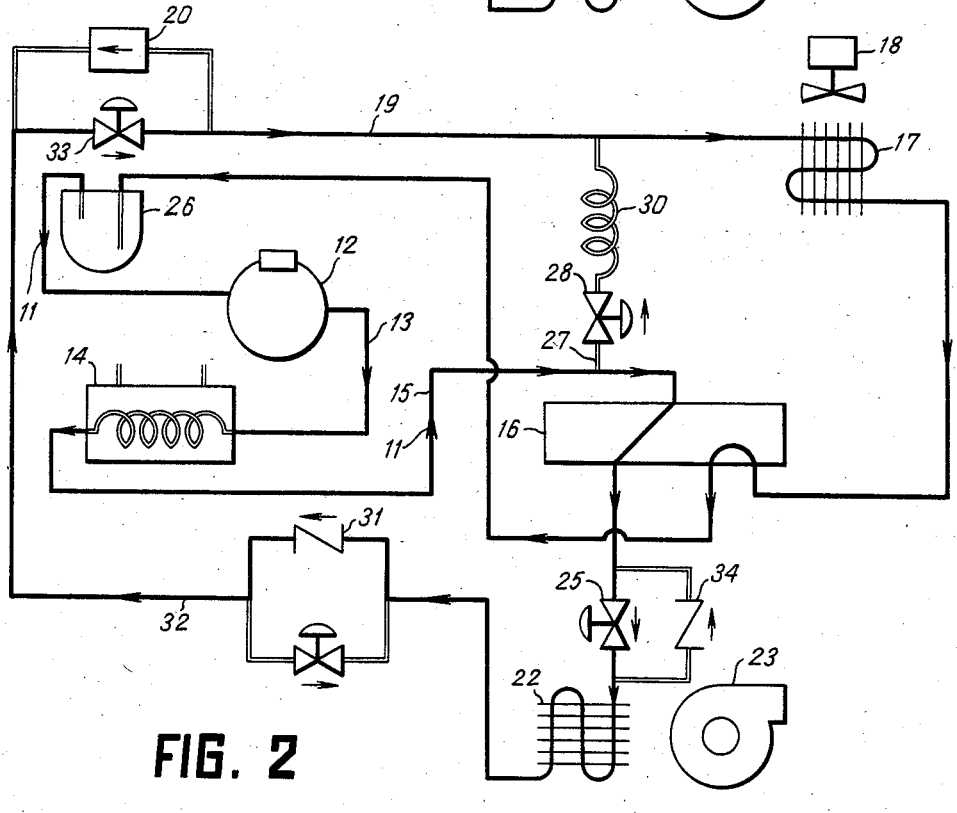
FIG. 2 is a schematic diagram of the refrigerant flow portion of an integrated heat pump water heater system, showing a second refrigerant flow configuration.

FIG. 2 shows the configuration of the refrigerant flow for space heating. This circuit arrangement is essentially the same as the space heating mode for a conventional space conditioning heat pump. The compressor 12 supplies hot, superheated refrigerant under high pressure through refrigerant line 13 to the refrigerant-to-water heat exchanger 14. The hot gas is transported through refrigerant line 15 to the reversing valve 16. This valve directs the refrigerant through solenoid valve 25, which is open in this mode, to the indoor coil 22 and blower unit 23 where indoor air is circulated over the coil, removing heat from the refrigerant thereby condensing it to a liquid. The refrigerant then is transported through check valve 31 and refrigerant line 32 to expansion device valve 33. The expansion device 33 throttles the refrigerant from a high presure, high temperature state to a low pressure, low temperature state. It then travels through refrigerant line 19 to the outdoor coil 17 and fan unit 18 where heat from circulated outdoor air evaporates the refrigerant. This low pressure refrigerant gas then goes to reversing valve 16 where it is directed to the suction accumulator 26 and then returned to compressor 12, where the low pressure gas is compressed to a high pressure, high temperature gas to complete the cycle. As with the cooling configuration, refrigerant line 27 and its in-line components 28 and 30 are inactive since solenoid valve 28 is in its normally closed position.

Again, water heating will depend on whether or not water is circulated through the refrigerant-to-water heat exchanger 14. If water is circulated, it removes part or all of the refrigerant superheat. The indoor coil 22 and blower unit 23 is also operable to complete refrigerant condensing and thereby provide space heating.

Figure 3:
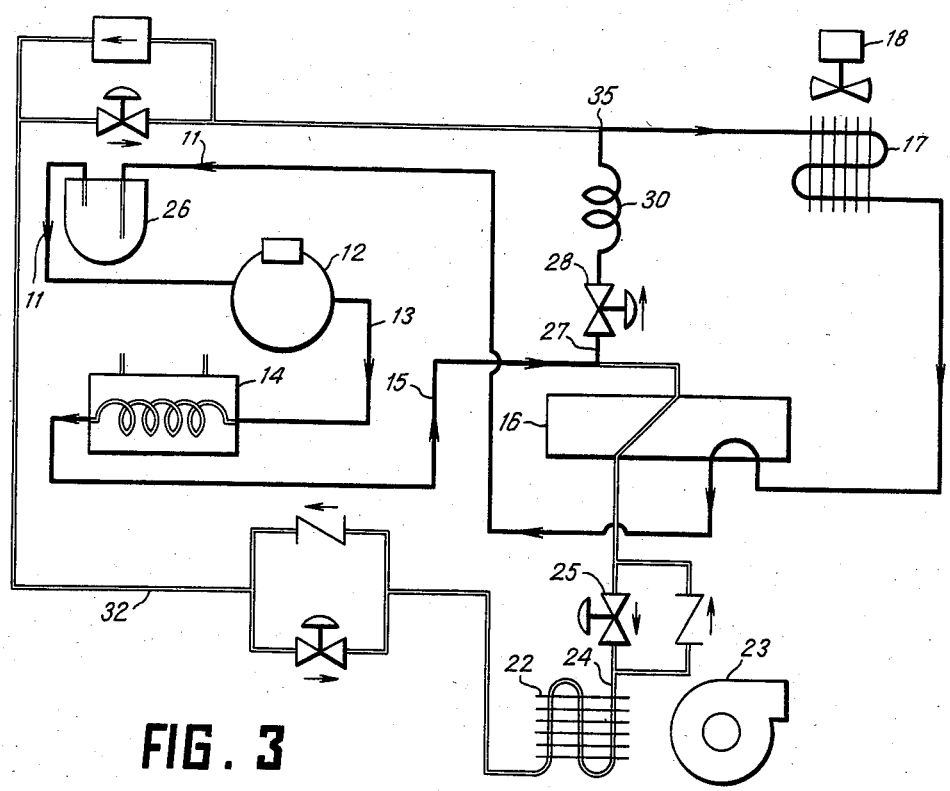
FIG. 3 is a schematic diagram of the refrigerant flow portion of an integrated heat pump water heater system, showing a third refrigerant flow configuration.

The configuration to supply water heating only is shown schematically in FIG. 3. In this mode all of the refrigerant's heat is taken for water heating and outdoor air is utilized for refrigerant evaporation. The indoor coil 22 and blower unit 23 and associated subcircuit components are isolated from the refrigeration circuit by closing solenoid valve 25. The outdoor fan 18 may be operated at a reduced speed at high outdoor temperatures to prevent overloading the compressor. Compressor 12 supplies hot, superheated refrigerant under high pressure through refrigerant line 13 to refrigerant-to-water heat exchanger 14. Water is circulated through this heat exchanger removing heat for water heating sufficient to condense the refrigerant. The high pressure liquid refrigerant is transported through refrigerant line 15 to refrigerant line 27 through solenoid valve 28, which is open in this mode. The high pressure refrigerant passes through a dedicated expansion device 30 that throttles the refrigerant from a high pressure, high temperature state to a low pressure, low temperature state. The refrigerant then goes to outdoor coil 17 and fan unit 18 where heat from the outdoor air evaporates it. The low pressure gas goes to reversing valve 16 where it is directed to suction accumulator 26 and finally back to compressor 12. The compressor compresses the low pressure gas to a high pressure superheated gas to complete the cycle. In this mode of operation, since the indoor coil 22 is isolated from the high pressure side of the circuit, any residual liquid refrigerant in this coil and associated lines 24 and 32 is removed by flow through expansion device 33 at junction 35 because of the lower pressure in the circuit between the expansion device 30 and the suction port of compressor 12. This is important for proper management of the refrigerant for satisfactory system operation.

By placing the hot water heating dedicated line 27 and expansion device 30 ahead of the reversing valve 16, the need to circulate refrigerant in the liquid state through reversing valve 16 is avoided. However, the hot water heating dedicated line 27 and expansion device 30 may be used after reversing valve 16.

Also, the dedicated expansion device 30 allows stable system operation in this mode. The use of the same expansion device 33 utilized for space heating is unsatisfactory for this mode since its capacity is too great for dedicated water heating, within the desirable operating parameters. Preferably, the dedicated expansion device 30 is a fixed restriction expansion device and may comprise a capillary tube.

Figure 4:
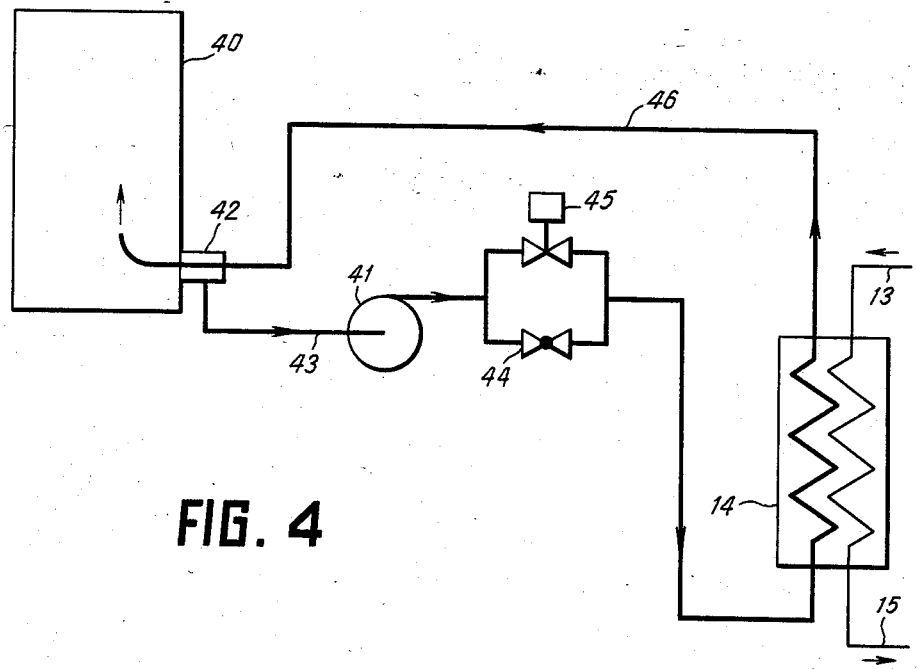
FIG. 4 is a schematic diagram of the hot water flow portion of an integrated heat pump water heater system.

FIG. 4 shows the water heating plumbing schematic for the integrated heat pump water heater system. Water is drawn from the hot water tank 40 by circulating pump 41. Water leaves the tank via coaxial fitting 42 and flows through the heat exchanger supply pipe 43 to the suction port of circulating pump 41. It then goes through either valve 44 or hydronic zone valve 45. From this parallel circuit, water is supplied to refrigerant-to-water heat exchanger coil 14 and picks up heat. The hot water flows from the heat exchanger via water line 46 to coaxial fitting 42 and is discharged into hot water tank 40. Hydronic zone valve 45 is closed when the system is either heating or cooling the interior air. In this case, the valve 44, which may be a globe valve or a thermostatic control valve, permits a reduced water flow rate to limit heat removal from the refrigerant for water heating to prevent condensing the refrigerant while operating in this mode. In the water heating only mode, an increased water flow rate is provided by opening hydronic zone valve 45 for increased heat removal for water heating since, in this mode, full condensing is done by refrigerant-to-water heat exchanger 14. Other means for controlling the water flow rate such as a variable speed pump or a flow control valve, both controlled by water temperature, may be employed equally satisfactorily.

While the invention has been described in detail with particular reference to the preferred embodiment thereof, it will be understood that variations and modifications can be effected within the spirit and scope of the invention as previously described and as defined by the claims.

What is claimed is:

1. An integrated heat pump water heater system for providing either heating or cooling of an interior space, and heating water in conjunction with either the heating or cooling cycle or independently, by means of a refrigerant flowing through the system, comprising:
   a compressor;
   a first heat exchanger means for providing heat to the interior space in the heating cycle and for removing heat during the cooling cycle by heat transfer with a refrigerant therein;
   a second heat exchanger means for transferring heat to or from a refrigerant therein by heat exchanger with an exterior medium;
   a third heat exchanger means for transferring heat from a refrigerant therein to water circulated therethrough;
   a first expansion device;
   a second expansion device;
   a third expansion device;
   refrigerant flow connection means connected between said compressor, said heat exchanger means, and said expansion devices which may be controllably connected in alternate configurations whereby,
   in a first configuration the refrigerant flow is sequentially from said compressor, through said third heat exchanger means, through said second heat exchanger means, through said first expansion device, through said first heat exchanger means, and back to said compressor,
   in a second configuration the refrigerant flow is sequentially from said compressor, through said third heat exchanger means, through said first heat exchanger means, through said second expansion device, through said second heat exchanger means, and back to said compressor,
   in a third configuration the refrigerant flow is sequentially from said compressor, through said third heat exchanger means, through said third expansion device, through said second heat exchanger means, and back to said compressor;
   flow connection control means for configuring said refrigerant flow connection means; and
   cycle control means for controlling the operation of said compressor and the rate of flow of water through said third heat exchanger means based on the configuration of the system, the temperature of the water to be heated, and the temperature of the interior space.

2. The system of claim 1, wherein said third expansion device is sized for refrigerant flow in the third configuration of said refrigerant flow connection means, where water is heated in said third heat exchanger.

3. The system of claim 1, wherein said refrigerant flow connection means comprises a reversing valve, and wherein said third heat exchanger means and said third expansion device are directly connected by said refrigerant flow connection means without said reversing valve therebetween, such that when the system is in said third configuration condensed refrigerant from said third heat exchanger means does not flow through said reversing valve.

4. The system of claim 2, wherein said third expansion device is a capillary tube.

5. The system of claim 3, wherein said third expansion device is a capillary tube.

6. The system of claim 4, wherein said first and second expansion devices are thermostatic expansion valves.

7. The system of claim 4, wherein said first and second expansion devices comprise a single two-way expansion device.

8. The system of claim 1, wherein said second heat exchanger means comprises a variable speed fan for causing ambient air to flow through said heat exchanger means, and wherein said cycle control means further controls the speed of said variable speed fan to adjust the amount of heat transferred between the ambient air and the refrigerant.

9. The system of claim 2, wherein said second heat exchanger means comprises a variable speed fan for causing ambient air to flow through said heat exchanger means, and wherein said cycle control means further controls the speed of said variable speed fan to adjust the amount of heat transferred between the ambient air and the refrigerant.

10. The system of claim 4, wherein said second heat exchanger means comprises a variable speed fan for causing ambient air to flow through said heat exchanger means, and wherein said cycle control means further controls the speed of said variable speed fan to adjust the amount of heat transferred between the ambient air and the refrigerant.

11. The system of claim 1, wherein said second heat exchanger means transfers heat to or from a refrigerant therein and the exterior ambient air.

12. The system of claim 1, wherein said second heat exchanger means transfers heat to or from a refrigerant therein and water.

13. The system of claim 12, wherein said water in said second heat exchanger means is provided by a closed loop system wherein the water is cooled or heated in the ground after passing through said heat exchanger means.

14. The system of claim 12, wherein said water in said second heat exchanger means is provided from an external source of water in a once-through system.

* * * * *